United States Patent
Swinkels et al.

(10) Patent No.: US 9,756,405 B2
(45) Date of Patent: Sep. 5, 2017

(54) CONTROL PLANE ASSISTED OPTICAL SWITCH

(71) Applicant: Ciena Corporation, Hanover, MD (US)

(72) Inventors: Gerard Leo Swinkels, Ottawa (CA); Darren Hennigar, Ottawa (CA); Choudhury A. Al Sayeed, Gloucester (CA)

(73) Assignee: Ciena Corporation, Hanover, MD (US)

( * ) Notice: Subject to any disclaimer, the term of this patent is extended or adjusted under 35 U.S.C. 154(b) by 107 days.

(21) Appl. No.: 14/876,012

(22) Filed: Oct. 6, 2015

(65) Prior Publication Data

US 2017/0099530 A1  Apr. 6, 2017

(51) Int. Cl.
*H04J 14/00* (2006.01)
*H04Q 11/00* (2006.01)

(52) U.S. Cl.
CPC . *H04Q 11/0005* (2013.01); *H04Q 2011/0037* (2013.01)

(58) Field of Classification Search
CPC .................... H04Q 11/0005; H04Q 2011/0037
USPC .......................................................... 398/45
See application file for complete search history.

(56) References Cited

U.S. PATENT DOCUMENTS

| | | | |
|---|---|---|---|
| 6,765,189 B1 | 7/2004 | Sahu et al. | |
| 8,160,453 B1 | 4/2012 | Harley et al. | |
| 8,402,121 B2 | 3/2013 | Sklecki et al. | |
| 8,509,621 B2 | 8/2013 | Boertjes et al. | |
| 8,553,707 B2 | 10/2013 | Swinkels et al. | |
| 2007/0206512 A1 | 9/2007 | Hinds et al. | |
| 2011/0222394 A1 | 9/2011 | Swinkels et al. | |
| 2011/0222862 A1 | 9/2011 | Boertjes et al. | |
| 2013/0308948 A1 | 11/2013 | Swinkels et al. | |
| 2014/0147107 A1 | 5/2014 | Swinkels et al. | |
| 2014/0169791 A1 | 6/2014 | Swinkels et al. | |
| 2014/0314409 A1 | 10/2014 | Swinkels et al. | |
| 2015/0003448 A1 | 1/2015 | Swinkels et al. | |
| 2015/0131989 A1* | 5/2015 | Syed | H04L 41/0803 398/45 |
| 2015/0131997 A1* | 5/2015 | Syed | H04Q 11/0066 398/69 |

OTHER PUBLICATIONS

Ceccarelli et al., "Traffic Engineering Extensions to OSPF for Generalized MPLS (GMPLS) Control of Evolving G.709 OTN Networks draft-ietf-ccamp-gmpls-ospf-g709v3-13," CCAMP Working Group, Dec. 11, 2013, pp. 1-35.

(Continued)

*Primary Examiner* — Juan A Torres
(74) *Attorney, Agent, or Firm* — Clements Bernard Walker PLLC; Christopher L. Bernard; Lawrence A. Baratta, Jr.

(57) ABSTRACT

Systems and methods for controlling an optical switch via one of a control plane and Software Defined Networking (SDN) include associating one or more managed endpoints with one or more line ports of an optical switch; receiving state information for the one or more managed endpoints over a session associated with one of the control plane and the SDN; and controlling switching of the one or more line ports based on the state information for the one or more managed endpoints. The optical switch is an all-optical device which does not have access to digital signal quality information of associated signals.

20 Claims, 7 Drawing Sheets

(56) References Cited

OTHER PUBLICATIONS

Mannie, "Generalized Multi-Protocol Label Switching (GMPLS) Architecture," Network Working Group, Oct. 2004, pp. 1-69.
"Distributed Call and Connection Management: Signalling mechanism using GMPLS RSVP-TE," International Telecommunication Union, Mar. 2003, pp. 1-46.
"Architecture for the automatically switched optical network," International Telecommunication Union, Feb. 2012, pp. 1-124.
"OpenFlow Switch Specification," Open Networking Foundation, Jun. 25, 2012, pp. 1-106.

* cited by examiner

CONTROL PLANE ASSISTED OPTICAL SWITCH

FIELD OF THE DISCLOSURE

The present disclosure generally relates to optical networking systems and methods. More particularly, the present disclosure relates to a control plane assisted optical switch which uses a call state associated with an end-to-end photonic call to manage a 'blind' optical switch.

BACKGROUND OF THE DISCLOSURE

Figure 2:
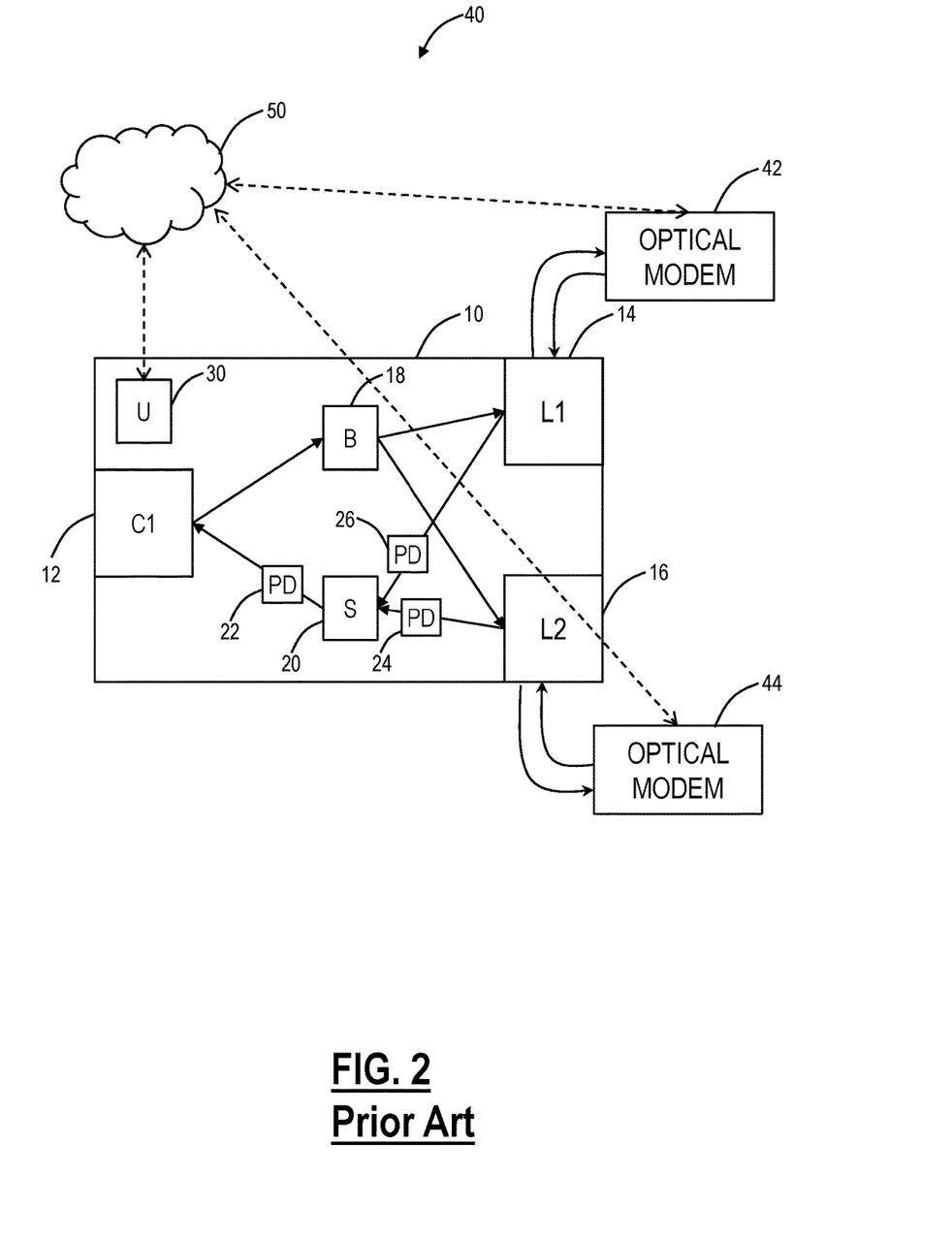
FIG. 2 is a block diagram of the optical switch of FIG. 1 in a dual modem configuration.

Optical protection switches are all-optical devices that enable a single client (0:1) to support line-side protection (1+1, 1:1, optical ring protection, etc.). As described herein, an optical switch (which can also be referred to as an optical protection switch, a photonic switch, a broadband optical switch, an optical power switch, etc.) is an all-optical device which performs switching based on optical power and which does not have direct access to digital information (e.g., digital Performance Monitoring (PM) data points such Bit Error Rate (BER), Loss of Frame (LOF), etc.) for control thereof. That is, an optical switch is an all-optical device using a light detector to determine a presence or loss of light on each port. Also, conventionally, the optical switch does not participate in a control plane or under Software Defined Networking (SDN) control. Advantageously, optical switches are used to reduce client interfaces since a vast majority of faults are on the line side such as in the optical network affecting one of the lines. In conventional deployments, an example of which is illustrated in FIG. 2, include a single client interface with two optical modems on the line side each connected to the optical switch. Concurrently, optical deployments have moved to coherent optical modems which can support variable bit rates from 100 Gb/s to 400 Gb/s and beyond. As these coherent optical modems support advanced functionality and high bit rates, their overall cost is significant. The conventional deployments with optical modems and optical switches utilize two optical modems on the line side with a single client interface on the client side. Disadvantageously, this conventional deployment is expensive, essentially requiring 2× the line side optics. It would be advantageous only to have a single optical modem on the client side which essentially can perform the same functionality. Note, optical switches utilize photodetectors or the like to detect optical power only. Client controlled switching is essentially blind—the optical modem on the client side does not know which line port is currently active.

BRIEF SUMMARY OF THE DISCLOSURE

In an exemplary embodiment, a method of controlling an optical switch via one of a control plane and Software Defined Networking (SDN) includes associating one or more managed endpoints with one or more line ports of an optical switch; receiving state information for the one or more managed endpoints over a session associated with one of the control plane and the SDN; and controlling switching of the one or more line ports based on the state information for the one or more managed endpoints. The optical switch is an all-optical device that does not have access to digital signal quality information of associated signals. A optical modem can be connected to a client side of the optical switch and the optical modem is optically broadcast and switched between two line ports, wherein the optical switch utilizes the state information for the one or more managed endpoints to determine which of the two line ports to use. The optical switch can be configured to lockout the one or more line ports responsive to state information for the one or more managed endpoints being DOWN or NONE. The state information for the one or more managed endpoints can be one of 1) an active call with a valid data plane, 2) an active call with an invalid data plane, and 3) no active call. The optical switch can be configured to use a line port with 1) the active call with the valid data plane and to lockout line ports with either 2) the active call with the invalid data plane or 3) no active call. The receiving state information can further include receiving a nominal path, and wherein the controlling switching of the one or more line ports is further based on the nominal path. The optical switch can include a client port connected to an optical modem; a first line port connected to an optical component managed as a first managed endpoint; a second line port connected to an optical component managed as a second managed endpoint; a broadcast device configured to broadcast transmit connections from the client port to each of the first line port and the second line port; a selector configured to switch a receive connection from one of the first line port and the second line port to the client port; and a controller communicatively coupled to the selector and configured to perform the receiving and the controlling. The controlling switching can be further based on one or more photodetectors detecting a loss of light on one of the one or more line ports.

In another exemplary embodiment, an apparatus configured to control an optical switch via one of a control plane and Software Defined Networking (SDN) includes a network interface communicatively coupled to one of the control plane and the SDN; a processor communicatively coupled to the network interface; and memory storing instructions that, when executed, cause the processor to associate one or more managed endpoints with one or more line ports of an optical switch, receive state information for the one or more managed endpoints over a session associated with one of the control plane and the SDN, and controlling switching of the one or more line ports based on the state information for the one or more managed endpoints. The optical switch is an all-optical device that does not have access to digital signal quality information of associated signals. A optical modem can be connected to a client side of the optical switch and the optical modem is optically broadcast and switched between two line ports, wherein the optical switch utilizes the state information for the one or more managed endpoints to determine which of the two line ports to use. The processor can be configured to lockout the one or more line ports responsive to state information for the one or more managed endpoints being DOWN or NONE. The state information for the one or more managed endpoints can be one of 1) an active call with a valid data plane, 2) an active call with an invalid data plane, and 3) no active call. The processor can be configured to cause the optical switch to use a line port with 1) the active call with the valid data plane and to lockout line ports with either 2) the active call with the invalid data plane or 3) no active call. The state information can further include a nominal path, and wherein the one or more line ports are further switched based on the nominal path. The optical switch can include a client port connected to an optical modem; a first line port connected to an optical component managed as a first managed endpoint; a second line port connected to an optical component managed as a second managed endpoint; a broadcast device configured to broadcast transmit connections from the client port to each of the first line port and the second line port; and a selector configured to switch a receive connection from one of the first line port and the second line port to the client port.

In a further exemplary embodiment, an optical switch controlled via one of a control plane and Software Defined Networking (SDN) includes a client port connected to an optical modem; a first line port connected to an optical component managed as a first managed endpoint; a second line port connected to an optical component managed as a second managed endpoint; a broadcast device configured to broadcast transmit connections from the client port to each of the first line port and the second line port; a selector configured to switch a receive connection from one of the first line port and the second line port to the client port; and a controller communicatively coupled to the selector and configured to control the selector based on state information for the first managed endpoint and the second managed endpoint from one or more of the control plane and the SDN. The optical switch is an all-optical device that does not have access to digital signal quality information of associated signals. The state information can be one of 1) an active call with a valid data plane, 2) an active call with an invalid data plane, and 3) no active call; and wherein the controller can be configured to cause the optical switch to use a line port with 1) the active call with the valid data plane and to lockout line ports with either 2) the active call with the invalid data plane or 3) no active call.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, a control plane assisted optical switch is described which uses a call state associated with an end-to-end photonic call to manage a 'blind' optical switch. The control plane assisted optical switch associates a control plane photonic end-point (usually a channel multiplexer/demultiplexer port) with the line port of an optical switch. A messaging/signaling network is established where a control plane node (or proxy) can communicate with an optical switch or host proxy to send endpoint control plane call information (e.g., up, down, none) to the optical switch. The optical switch is configured to process messages, to use call data plane details of down and none to prevent the optical switch from selecting that line port. For example, the optical switch can be configured not to use or to switch away from a line port with call data plane details of down and none/missing. Advantageously, the control plane assisted optical switch enables an optical modem on the client side, thereby reducing the number of modems in half. The control plane assisted optical switch provides a trigger for optical modems connected on a filterless channel multiplexer/demultiplexer (CMD) port (the CMD is used to ingress/egress signals from the optical modems to a photonic network).

As is described herein, the control plane endpoint call state advantageously is used herein to control an optical switch, with an optical modem on the client side by itself. In this single modem configuration, the optical switch, using the client alone, is essentially a blind switch. To overcome this limitation, modems are positioned on the line side, which is costly having 2× the modems. In conjunction, photonic or optical networks are becoming control plane-enabled (or SDN controlled). The control plane, as part of the operation, understands the data plane's state. Specifically, the control plane is aware of when the data plane is down, so the optical switch can effectively lockout the associated port.

Optical Switch

Figure 1:
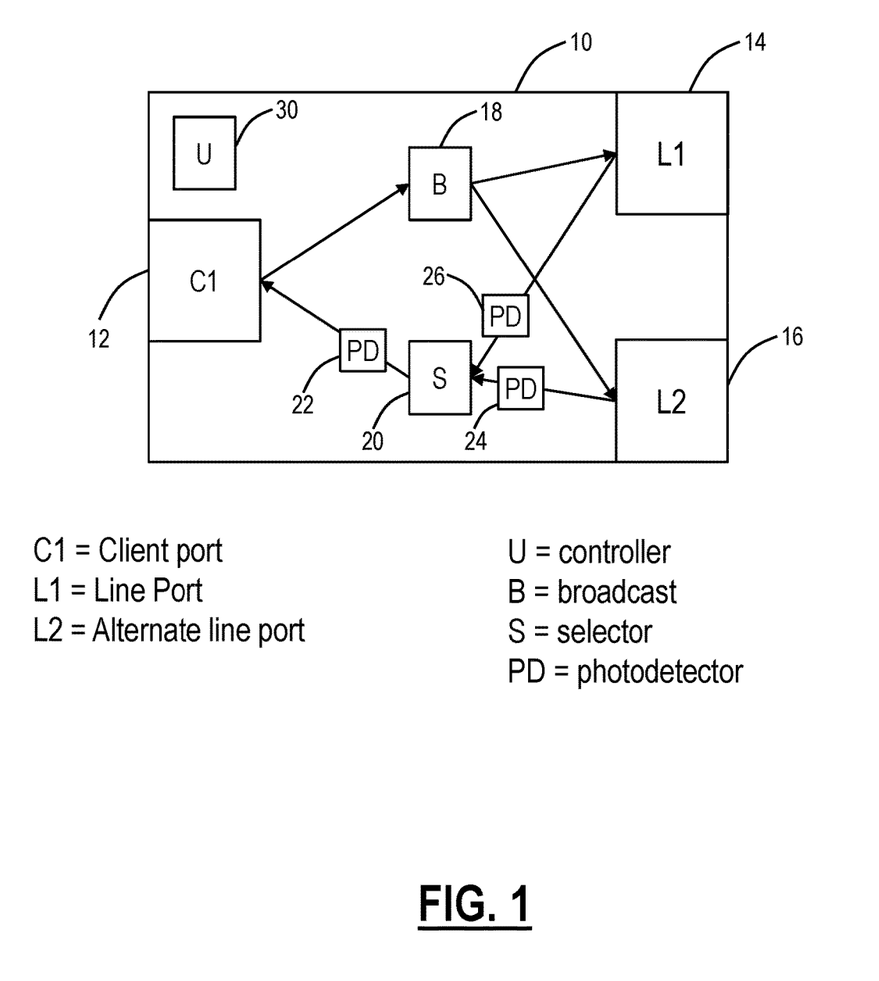
FIG. 1 is a block diagram of an optical switch.

Referring to FIG. 1, in an exemplary embodiment, a block diagram illustrates an optical switch 10. The optical switch 10 includes a client port (C1) 12, a line port (L1) 14, and a line port (L2) 16. The optical switch 10 is bidirectional with each of the ports 12, 14, 16 having a transmit and a receive connection. Functionally, the optical switch 10 is configured to switch the client port 12 between either of the line ports 14, 16. From the client port 12 to the line ports 14, 16, a broadcast 18 device is configured to split the transmit connection from the client port 12 to both of the line ports 14, 16. The broadcast 18 can be a 1:2 splitter, bridge, or the like. Thus, each of the line ports 14, 16 has an active transmit connection from the client port 12 which are transmitted over a network for redundancy. From the line ports 14, 16 to the client, a selector 20 is configured to receive both of the line ports 14, 16 and send one to the receive connection of the client port 12. The selector 20 can be a 2:1 switch or the like. Thus, the optical switch 10 receives two active receive connections from the network for redundancy and provides a one of these two active receive connections to the client port 12. It is up to the optical switch 10 to determine which of these two active receive connections to provide to the client port 12.

Conventionally, the optical switch 10 can include one or more photodetectors 22, 24, 26 on various sides of the selector 20, to detect the presence or loss of light. Based on the presence or loss of light, the selector 20 can switch from the two active receive connections from the line ports 14, 16. In an exemplary embodiment, only the photodetector 22 is used, and the selector 20 switches between the line ports 14, 16 until the presence of light is detected by the photodetector 22. In another exemplary embodiment, the photodetectors 24, 26 are used, and the selector 20 switches between the line ports 14, 16 based on the presence or absence of light detected by the photodetectors 24, 26. Additionally, the optical switch 10 can include a controller (U) 30 communicatively coupled to the ports 12, 14, 16, the broadcast 18, the selector 20, and any of the photodetectors 22, 24, 26. The controller 30 can provide a management interface to the optical switch 10, including connectivity to a Network Management System (NMS) or the like. The controller 30 can be used to control manually the selector 20 as well as to provide alarm and other PM data related to optical performance.

Optical Switch—Dual Modem Configuration

Referring to FIG. 2, in a conventional embodiment, a block diagram illustrates the optical switch 10 in a dual modem configuration 40. Specifically, the dual modem configuration 40 includes two optical modems 42, 44 on the line side, i.e., the optical modem 42 is connected to the line port 14 and the optical modem 44 is connected to the line port 16. In an exemplary embodiment, the dual modem configuration 40 can include the photodetectors 24, 26 in the optical switch 10 each configured to detect the presence or absence of light from the optical modems 42, 44 and to control the selector 20 based thereon. In another exemplary embodiment, the dual modem configuration 40 can include only the photodetector 22 which is configured to detect the presence or absence of light from the currently selected optical modems 42, 44 by the selector 20 and to control the selector 20 based thereon. In a further exemplary embodiment, the optical modems 42, 44 can be communicatively coupled to the controller 30 via a Data Communication Network 50. Here, the optical modems 42, 44 can provide signaled or non-signaled messages between the controller 30, such as protection messages (e.g., subnetwork protection, etc.), digital signal quality (e.g., Bit Error Rate (BER), Loss of Frame (LOF), Loss of Signal (LOS), Alarm Indication Signal (AIS), etc.), and the like for control of the selector 20. Again, the dual modem configuration 40 requires both the optical modems 42, 44, which is inefficient and costly.

Optical Switch—Single Modem Configuration

Figure 3:
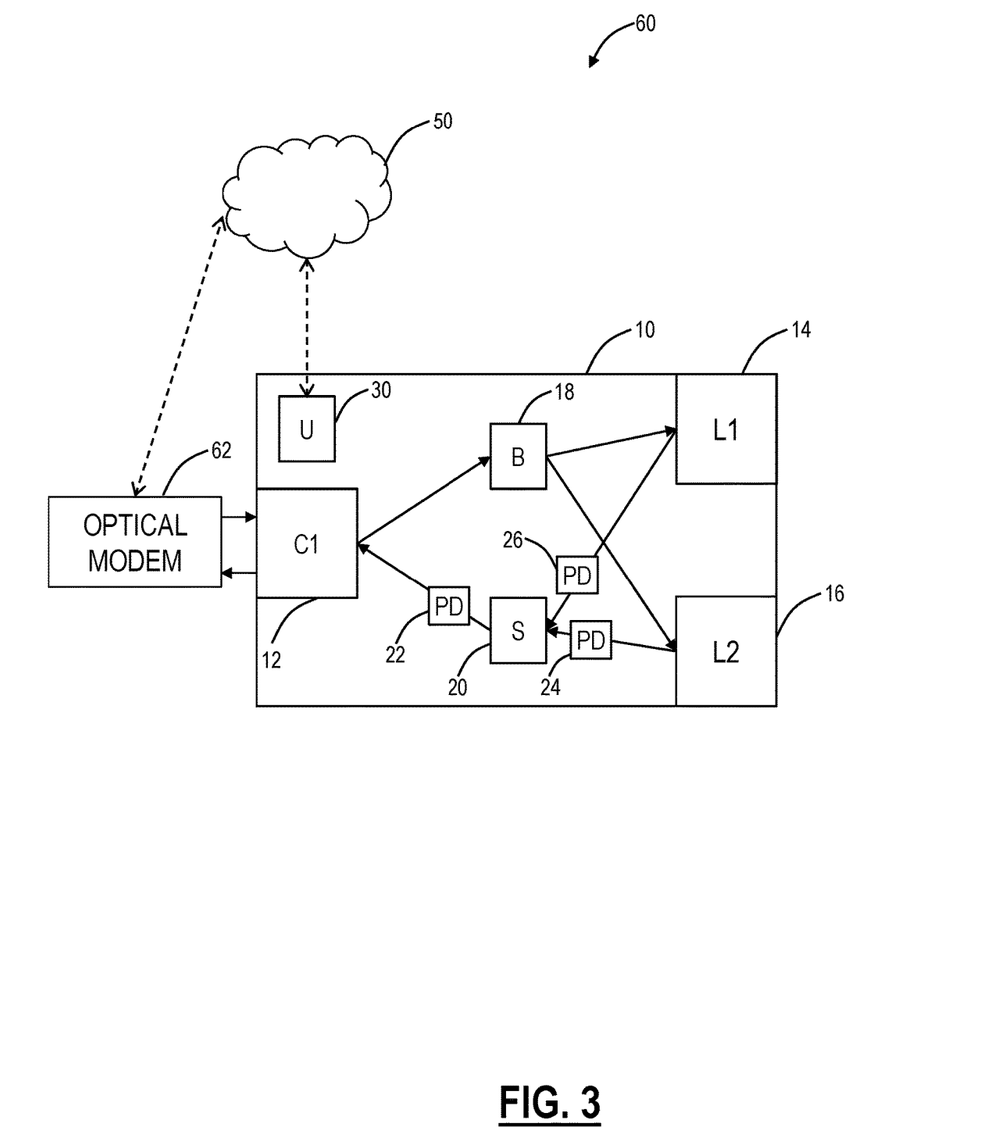
FIG. 3 is a block diagram of the optical switch of FIG. 1 in a single modem configuration.

Referring to FIG. 3, in an exemplary embodiment, a block diagram illustrates the optical switch 10 in a single modem configuration 60. Here, the single modem configuration 60 includes a single optical modem 62 on the client side, i.e., the optical modem 62 is connected to the client port 12. As described herein, the various photodetectors 22, 24, 26 are unable to detect properly the presence or absence of light, due to the splitting of light/power by the selector 20. Thus, the photodetectors 22, 24, 26 are not possible in the single modem configuration 60. In an exemplary embodiment, the optical modem 62 can be communicatively coupled to the controller 30 via the Data Communication Network 50. Here, the optical modem 62 can provide signaled or non-signaled messages between the controller 30, such as protection messages (e.g., subnetwork protection, etc.), digital signal quality (e.g., Bit Error Rate (BER), Loss of Frame (LOF), Loss of Signal (LOS), Alarm Indication Signal (AIS), etc.), and the like for control of the selector 20. However, the messages only provide a status of the currently selected receive connection by the selector 20. The optical switch 10 is effectively blind to the line side in the single modem configuration 60.

Channel Multiplexer/Demultiplexer (CMD) Ports

Traditionally, channel multiplexer/demultiplexer (CMD) ports are for a specific wavelength or spectrum, and this can be referred to as colored ports. For wavelength on the ITU grid with a 50 GHz spacing, a CMD port expects to operate with the spectrum associated with a center frequency and typically rejects or suppresses spectrum not associated with that center frequency. Due to manufacturing limitations (e.g., filter roll-off), the spectrum may be less than 50 GHz wide. With the advent of gridless or flexible grid networks which do not necessarily use the ITU grid or the like, such as ITU gridded 50 GHz spaced centered frequencies, the CMD may be made of filter-less ports such as using broad-band optical power splitters. By using coherent receivers in the optical modems 42, 44, 62, the CMD may deliver many frequencies of light to the optical modem and rely on the coherent optical receiver to discriminate the frequency of interest (akin to a radio). Alternatively, a tunable filter can be used in the receiver of the optical modem 42, 44, 62.

Again, the optical switch 10 with the photodetectors 22, 24, 26 relies on the loss of light to detect missing light. The required optical power to typically detect a missing wavelength is great, such as, for example, in excess of 5 dB. This is to accommodate optical power transients from the line system. Consider the case where a filter-less-CMD is used. Assume only two wavelengths with somewhat equal optical are using the CMD. In the single modem configuration, the optical switch 10 does not have an ability to discriminate a wavelength of interest. If the wavelength of interest drops out (due to a fault), the detected optical power on the optical switch 10 drops by ~3 dB, insufficient to trigger the optical switch 10 (due to loss of optical power on that specific wavelength).

Control Plane/Software Defined Networking (SDN)

Networks at various layers are being deployed with control planes, Software Defined Networking (SDN), Network Functions Virtualization (NFV), and the like. Control planes provide an automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2012), the contents of which are herein incorporated by reference; Wavelength Switched Optical Network (WSON) using the Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. Control planes are configured to establish end-to-end signaled connections to route the connections and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

Figure 4:
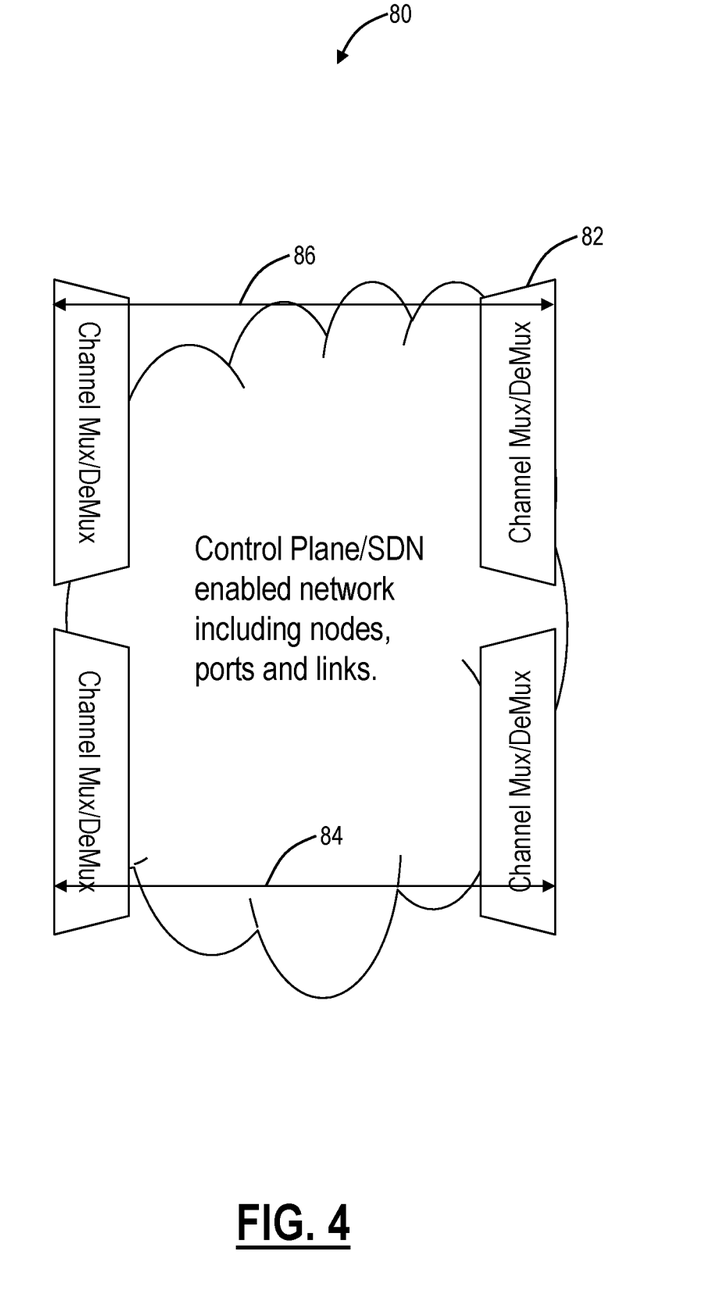
FIG. 4 is a network diagram of an optical network which is controlled by a control plane and/or SDN.

Referring to FIG. 4, in an exemplary embodiment, a network diagram illustrates an optical network 80 which is controlled by a control plane and/or SDN. In the optical network 80, the data plane and associated hardware includes optical fibers, optical amplifiers, ingress/egress ports such as a channel multiplexer/demultiplexer 82, Reconfigurable Optical Add/Drop Multiplexers (ROADMs), splitter, couplers, etc. Note, for illustration purposes in FIG. 4, only the channel multiplexer/demultiplexer 82 are shown, and those of ordinary skill in the art will recognize other components are contemplated in the optical network 80. The data plane edge for the optical network 80, for a control plane or SDN, is a port on the channel multiplexer/demultiplexer 82, which connects to the line ports 14, 16 on the optical switch 10. A typical feature set in a control plane or SDN includes nodes, links/lines, edge ports, line ports, and the like. The control plane includes a Signaling Control Network (SCN) with an adjacency or link/line discovery protocol, a signaling protocol, a topology/routing protocol, and the like. Through the control plane or SDN, path computation is performed, such as Constrained Shortest-Path First (CSPF). In the control plane or SDN, connections are calls, call segments, Subnetwork Connections (SNCs), Label Switched Paths (LSPs), etc. That is, the control plane or SDN is configured to manage calls through the configuration of the underlying hardware in the data plane. In an exemplary embodiment, calls 84, 86 are shown in the optical network 80 between two of the channel multiplexer/demultiplexers 82 and across the optical network 80. The calls 84, 86 have both a control and data plane state.

Control Plane Assisted Optical Switch

Figure 5:
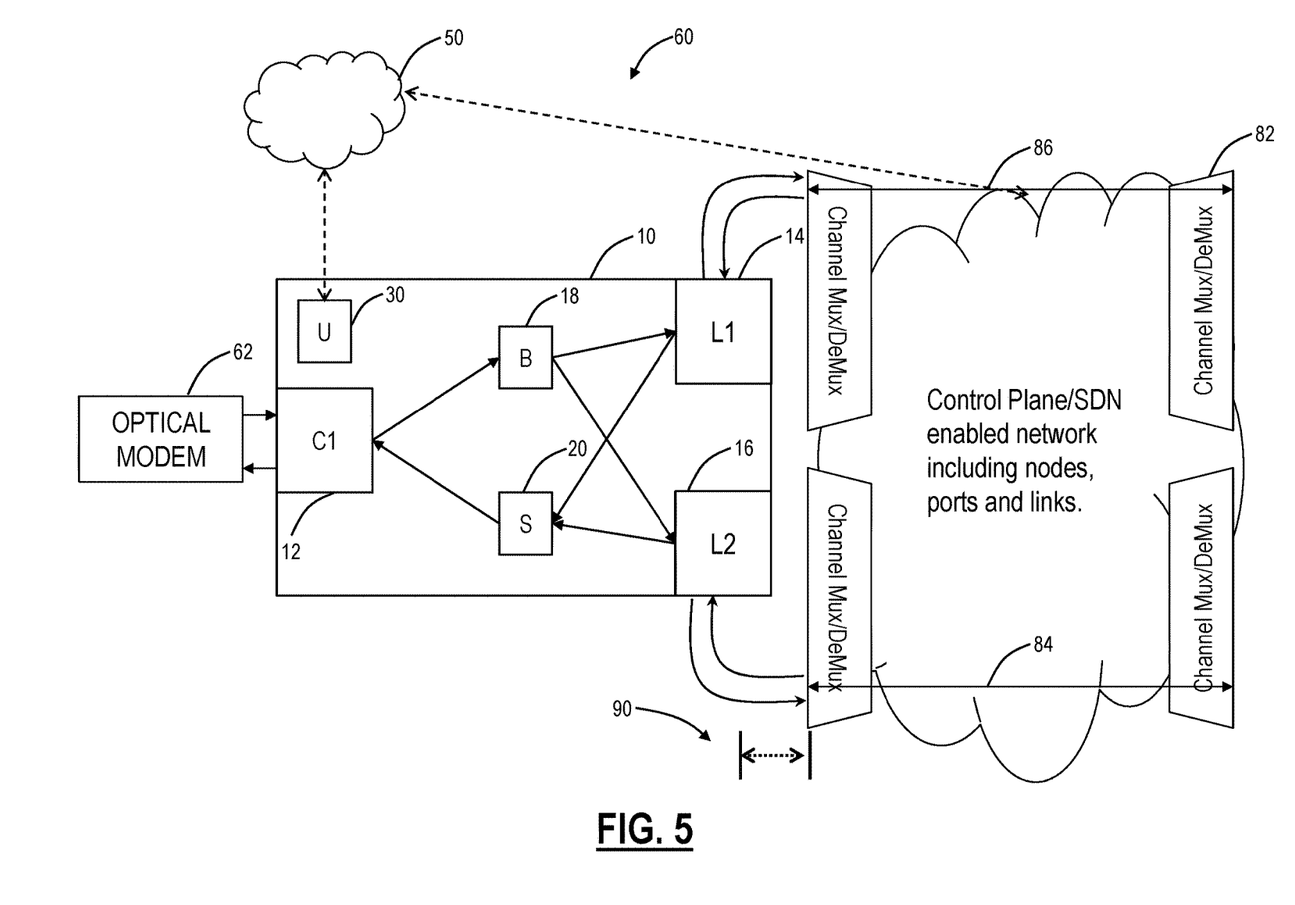
FIG. 5 is a network diagram of the optical network of FIG. 4 with the optical switch of FIG. 1 in the single modem configuration of FIG. 3, with an association between the control plane and the optical switch.

Referring to FIG. 5, in an exemplary embodiment, a network diagram illustrates the optical network 80 with the optical switch 10 in the single modem configuration 60, with an association between the control plane and the optical switch 10. In various exemplary embodiments, the control plane assisted optical switch includes associating a control plane photonic endpoint 90 with one of the line ports 14, 16 of the optical switch 10. As described herein, the control plane photonic endpoint 90 is usually a port on the channel multiplexer/demultiplexers 82. A messaging/signaling session is configured where a control plane node (or proxy) can communicate with the controller 30 on the optical switch 10 or a host proxy for the optical switch 10. Through the messaging/signaling session, endpoint call information (e.g., UP, DOWN, NONE) is provided to the optical switch 10. Also, the endpoint call information can include whether or not the call is on the nominal path (also referred to as the home route). The optical switch 10 is configured to process messages from the messaging/signaling session to perform control thereof. For example, call data plane details of DOWN and NONE can prevent the optical switch 10 from selecting that line port 14, 16, i.e., the selector 20 will not use it or will switch away from it).

The messaging/signaling session is configured to relay L0 control plane (or SDN) endpoint call state information to the optical switch 10. In an exemplary embodiment, the messaging/signaling session is between the optical switch 10 and a local control plane node (e.g., a DWDM network element participating in the control plane, a TDM and/or packet switch network element participating in the control plane, etc.). In another exemplary embodiment, the messaging/signaling session is between the optical switch 10 and any one of a host, a centralized proxy, an SDN controller, etc. The messaging/signaling session can be configured to only relay data related to the endpoint call state information of the line ports 14, 16. That is, the optical switch 10 does not have to participate fully in the control plane or SDN.

In a typical control plane implementation, the source node for a call contains all of the call information, and the associated destination node may contain some or all of the call information. More importantly, the destination node may delete all of the call information when a call is interrupted or the like. The optical switch 10 can be configured to get the call information from either the source node or the destination node, as both situations should provide valid endpoint call state information.

It is important to note the control plane assisted optical switch 10 does not participate in the control plane and is not necessarily under SDN control. That is, the optical switch 10 is not providing routing messages to the control plane or SDN messages to the SDN controller, nor is the optical switch 10 under active control of the control plane or SDN. Rather, the optical switch 10 is configured to receive updates from the control plane or SDN (i.e., endpoint call state information of the line ports 14, 16) and make local switching decisions based thereon. Thus, the present disclosure is not simply adding the optical switch 10 as another controlled device in the control plane or SDN, but rather taking existing information in the control plane or SDN (i.e., the endpoint call state information of the line ports 14, 16) and using this to make local decisions at the optical switch 10, in lieu of or in addition to detecting power loss based on the photodetectors 22, 24, 26.

SDN Assisted Optical Switch

Figure 6:
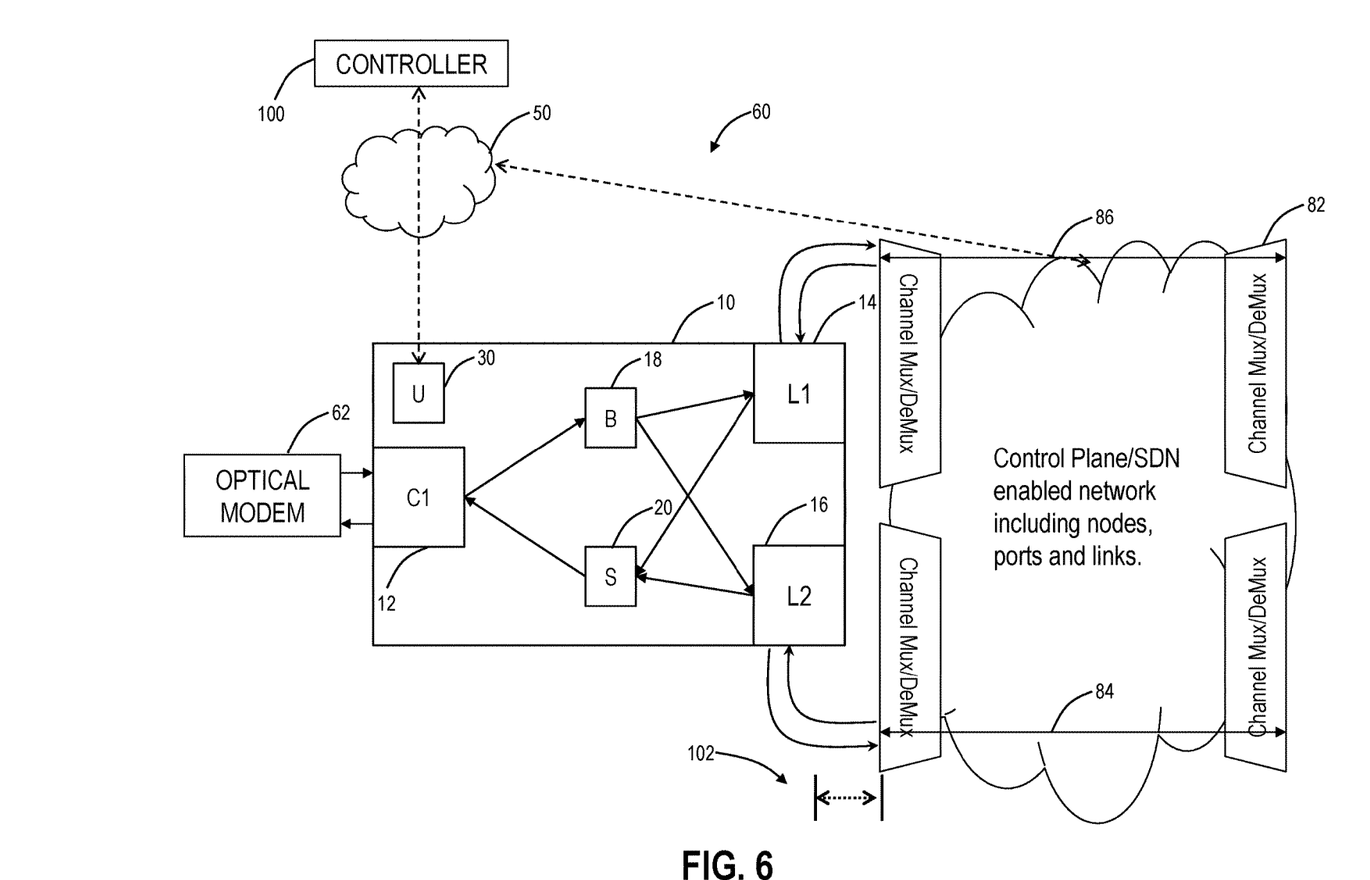
FIG. 6 is a network diagram of the optical network of FIG. 4 with the optical switch of FIG. 1 in the single modem configuration of FIG. 3, with an association between an SDN controller and the optical switch.

Referring to FIG. 6, in an exemplary embodiment, a network diagram illustrates the optical network 80 with the optical switch 10 in the single modem configuration 60, with an association between an SDN controller 100 and the optical switch 10. In FIG. 6, the control plane assisted optical switch includes associating an SDN photonic endpoint 102 with one of the line ports 14, 16 of the optical switch 10. As described herein, the SDN photonic endpoint 102 is usually a port on the channel multiplexer/demultiplexers 82. A messaging/signaling session is configured where the SDN controller 100 (or proxy) can communicate with the controller 30 on the optical switch 10 or a host proxy for the optical switch 10. Through the messaging/signaling session, endpoint call information (e.g., UP, DOWN, NONE) is provided to the optical switch 10. Also, the endpoint call information can include whether or not the call is on the nominal path (also referred to as the home route). The optical switch 10 is configured to process messages from the messaging/signaling session to perform control thereof. For example, call data plane details of DOWN and NONE can prevent the optical switch 10 from selecting that line port 14, 16, i.e., the selector 20 will not use it or will switch away from it). As in FIG. 5, the messaging/signaling session is configured to relay LO SDN endpoint call state information to the optical switch 10. In another exemplary embodiment, the messaging/signaling session is between the optical switch 10 and any one of a host, a centralized proxy, the SDN controller 100, etc. Also, note in both FIGS. 5 and 6, the control plane assisted optical switch 10 is not shown with any of the photodetectors 22, 24, 26. One or more of the photodetectors 22, 24, 26 may optionally be used to detect the removal of a fiber from the line port to the channel multiplexer/demultiplexer. Here, the optical switch 10 can use the detection of loss of power (of all wavelengths) as an additional trigger mechanism to switch, in addition to the endpoint call information. That is, the endpoint call information can be used to cause a switch based on loss of a single wavelength, detected by the endpoint call information, and the photodetectors 22, 24, 26 can be used to cause a switch based on a loss of all light on a port.

Endpoint and Optical Switch Messages

Through the messaging/signaling session, the optical switch 10 can determine via messages that 1) the endpoint 90, 102 has an active call with a valid data plane, i.e., the call is up and the data plane appears valid; 2) the endpoint 90, 102 has an active call with an invalid data plane, i.e., an optional message, useful for Permanent SNCs (P-SNC) or the like, indicating the call is in progress/recovering/down, but the data plane is deemed to be down; 3) the endpoint 90, 102 has no active call, i.e., no associated call and it is assumed the data plane is down. The foregoing can be referred to as states 1), 2), and 3).

For the state 1) where the endpoint 90, 102 has an active call with a valid data plane, the optical switch 10 can be configured to use this line port 14, 16 via the selector 20, i.e., no port lockout. For the state 2) where the endpoint 90, 102 has an active call with an invalid data plane, the optical switch 10 can be configured not to use this line port 14, 16 via the selector 20, i.e., a port lockout. For the state 3) where the endpoint 90, 102 has no active call, the optical switch 10 can be configured not to use this line port 14, 16 via the selector 20, i.e., a port lockout. That is, the optical switch 10, via the controller 30 and the messaging/signaling session collates and incorporates the endpoint call data plane state information into associated switching decisions, for the selector 20.

Nominal Path

As described herein, the controller 30 can be provided nominal path or home route information associated with a call. For example, consider the active line port 14, 16 is on the home path and the other is not. Also, consider that revertive switching is enabled. In the presence of two valid optical signals, it may be desirable to prevent the optical switch 10 from selecting a signal not on its nominal path in the presence of a signal that is using its nominal path. The rationale is that a call not on its home route may revert to its home route. If this reversion operation cannot be done in a make-before-break fashion, then the client signal will have been interrupted excessively, once to revert to the preferred selection position (to the working path), again to and alternate path when the working path reverts to its home route (to alternative path), and again when the selector 20 reverts to its preferred position (the working path, activate and possibly on its home route).

Process of Controlling an Optical Switch

Figure 7:
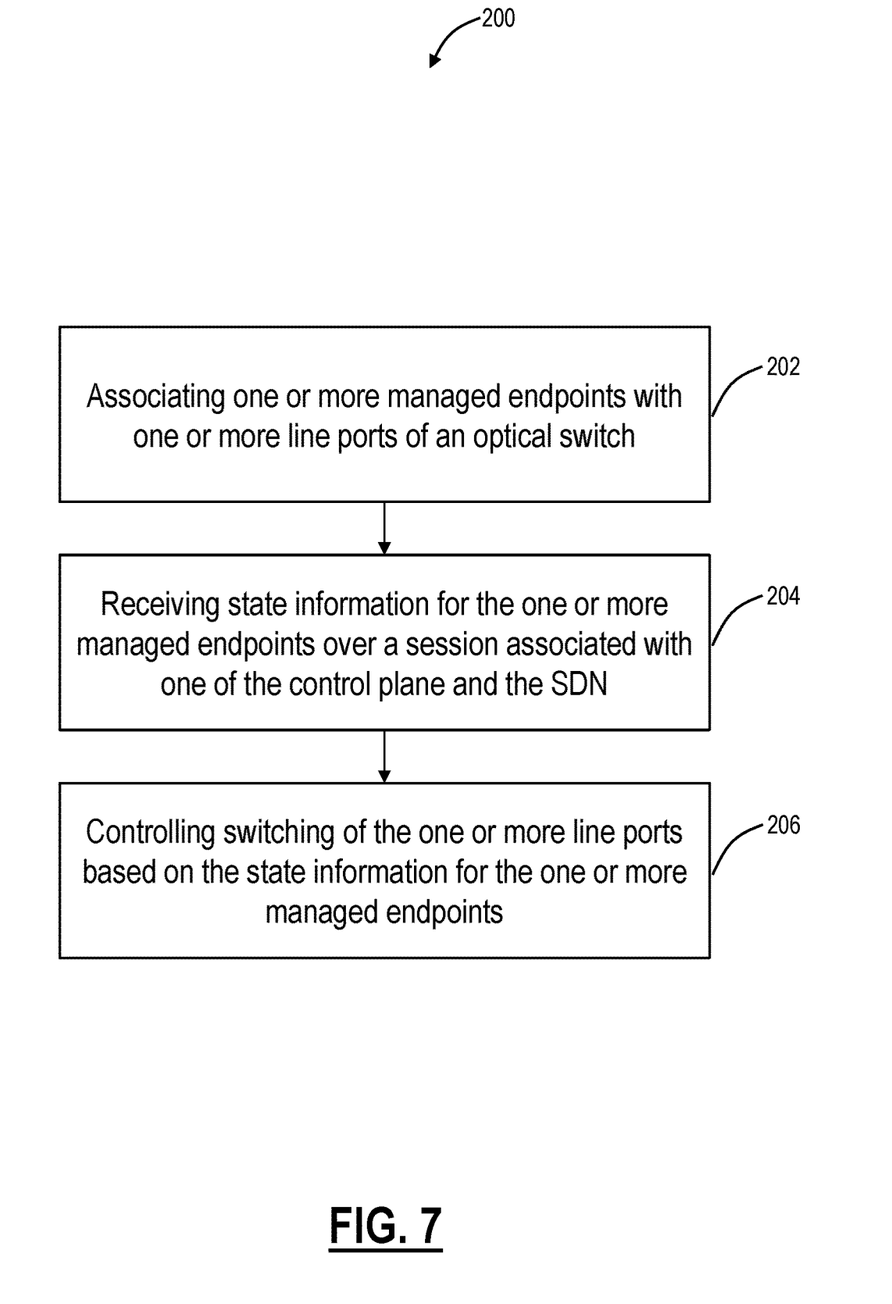
FIG. 7 is a flowchart of a process of controlling the optical switch via one of a control plane and Software Defined Networking (SDN).

Referring to FIG. 7, in an exemplary embodiment, a flowchart illustrates a process 200 of controlling the optical switch via one of a control plane and Software Defined Networking (SDN). The process 200 includes associating one or more managed endpoints with one or more line ports of an optical switch (step 202); receiving state information for the one or more managed endpoints over a session associated with one of the control plane and the SDN (step 204); and controlling switching of the one or more line ports based on the state information for the one or more managed endpoints (step 206). Again, the optical switch 10 is an all-optical device which does not have access to digital signal quality information of associated signals. An optical modem can be connected to a client side of the optical switch, and the optical modem is optically broadcast and switched between two line ports, wherein the optical switch utilizes the state information for the one or more managed endpoints to determine which of the two line ports to use. The optical switch is configured to lockout the one or more line ports responsive to state information for the one or more managed endpoints being DOWN or NONE. The state information for the one or more managed endpoints is one of 1) an active call with a valid data plane, 2) an active call with an invalid data plane, and 3) no active call. The optical switch is configured to use a line port with 1) the active call with the valid data plane and to lockout line ports with either 2) the active call with the invalid data plane and 3) no active call. The receiving state information can further include receiving a nominal path, and wherein the controlling switching of the one or more line ports is further based on the nominal path.

The optical switch can include a client port connected to an optical modem; a first line port connected to an optical component managed as a first managed endpoint; a second line port connected to an optical component managed as a second managed endpoint; a broadcast configured to broadcast transmit connections from the client port to each of the first line port and the second line port; a selector configured to switch a receive connection from one of the first line port and the second line port to the client port; and a controller communicatively coupled to the selector and configured to perform the receiving and the controlling.

It will be appreciated that some exemplary embodiments including the controller 30, the SDN controller 100, and control plane nodes described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of controlling an optical switch via one of a control plane and Software Defined Networking (SDN), the method comprising:
    associating one or more managed endpoints with one or more line ports of an optical switch;
    receiving state information for the one or more managed endpoints over a session associated with one of the control plane and the SDN; and
    controlling switching of the one or more line ports based on the state information for the one or more managed endpoints.

2. The method of claim 1, wherein the optical switch is an all-optical device that does not have access to digital signal quality information of associated signals.

3. The method of claim 1, wherein an optical modem is connected to a client side of the optical switch and the optical modem is optically broadcast and switched between two line ports, wherein the optical switch utilizes the state information for the one or more managed endpoints to determine which of the two line ports to use.

4. The method of claim 1, wherein the optical switch is configured to lockout the one or more line ports responsive to state information for the one or more managed endpoints being DOWN or NONE.

5. The method of claim 1, wherein the state information for the one or more managed endpoints is one of 1) an active call with a valid data plane, 2) an active call with an invalid data plane, and 3) no active call.

6. The method of claim 1, wherein the receiving state information further comprises receiving a nominal path, and wherein the controlling switching of the one or more line ports is further based on the nominal path.

7. The method of claim 1, wherein the optical switch comprises:
    a client port connected to an optical modem;
    a first line port connected to an optical component managed as a first managed endpoint;
    a second line port connected to an optical component managed as a second managed endpoint;
    a broadcast device configured to broadcast transmit connections from the client port to each of the first line port and the second line port;
    a selector configured to switch a receive connection from one of the first line port and the second line port to the client port; and
    a controller communicatively coupled to the selector and configured to perform the receiving and the controlling.

8. The method of claim 1, wherein the controlling switching is further based on one or more photodetectors detecting a loss of light on one of the one or more line ports.

9. The method of claim 5, wherein the optical switch is configured to use a line port with 1) the active call with the valid data plane and to lockout line ports with either 2) the active call with the invalid data plane or 3) no active call.

10. An apparatus configured to control an optical switch via one of a control plane and Software Defined Networking (SDN), the apparatus comprising:
    a network interface communicatively coupled to one of the control plane and the SDN;
    a processor communicatively coupled to the network interface; and
    memory storing instructions that, when executed, cause the processor to
        associate one or more managed endpoints with one or more line ports of an optical switch,
        receive state information for the one or more managed endpoints over a session associated with one of the control plane and the SDN, and
        controlling switching of the one or more line ports based on the state information for the one or more managed endpoints.

11. The apparatus of claim 10, wherein the optical switch is an all-optical device that does not have access to digital signal quality information of associated signals.

12. The apparatus of claim 10, wherein an optical modem is connected to a client side of the optical switch and the optical modem is optically broadcast and switched between two line ports, wherein the optical switch utilizes the state information for the one or more managed endpoints to determine which of the two line ports to use.

13. The apparatus of claim 10, wherein the processor is configured to lockout the one or more line ports responsive to state information for the one or more managed endpoints being DOWN or NONE.

14. The apparatus of claim 10, wherein the state information for the one or more managed endpoints is one of 1) an active call with a valid data plane, 2) an active call with an invalid data plane, and 3) no active call.

15. The apparatus of claim 10, wherein the state information further comprises a nominal path, and wherein the one or more line ports are further switched based on the nominal path.

16. The apparatus of claim 10, wherein the optical switch comprises:
    a client port connected to an optical modem;
    a first line port connected to an optical component managed as a first managed endpoint;
    a second line port connected to an optical component managed as a second managed endpoint;
    a broadcast device configured to broadcast transmit connections from the client port to each of the first line port and the second line port; and
    a selector configured to switch a receive connection from one of the first line port and the second line port to the client port.

17. The apparatus of claim 14, wherein the processor is configured to cause the optical switch to use a line port with 1) the active call with the valid data plane and to lockout line ports with either 2) the active call with the invalid data plane or 3) no active call.

18. An optical switch controlled via one of a control plane and Software Defined Networking (SDN), the optical switch comprising:
    a client port connected to an optical modem;
    a first line port connected to an optical component managed as a first managed endpoint;
    a second line port connected to an optical component managed as a second managed endpoint;
    a broadcast device configured to broadcast transmit connections from the client port to each of the first line port and the second line port;
    a selector configured to switch a receive connection from one of the first line port and the second line port to the client port; and
    a controller communicatively coupled to the selector and configured to control the selector based on state information for the first managed endpoint and the second managed endpoint from one or more of the control plane and the SDN.

19. The optical switch of claim 18, wherein the optical switch is an all-optical device that does not have access to digital signal quality information of associated signals.

20. The optical switch of claim 18, wherein the state information is one of 1) an active call with a valid data plane, 2) an active call with an invalid data plane, and 3) no active call; and
    wherein the controller is configured to cause the optical switch to use a line port with 1) the active call with the valid data plane and to lockout line ports with either 2) the active call with the invalid data plane or 3) no active call.

* * * * *